United States Patent Office 3,701,689
Patented Oct. 31, 1972

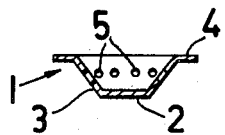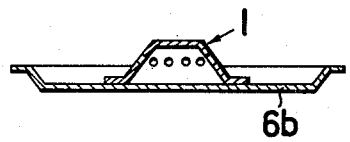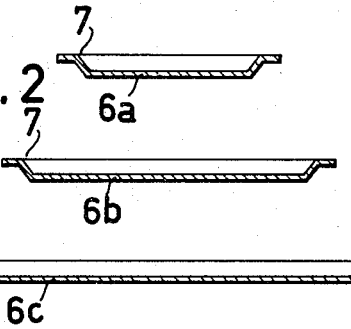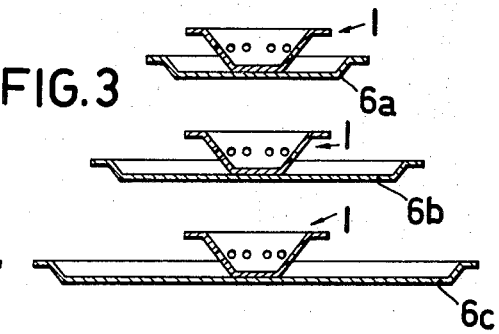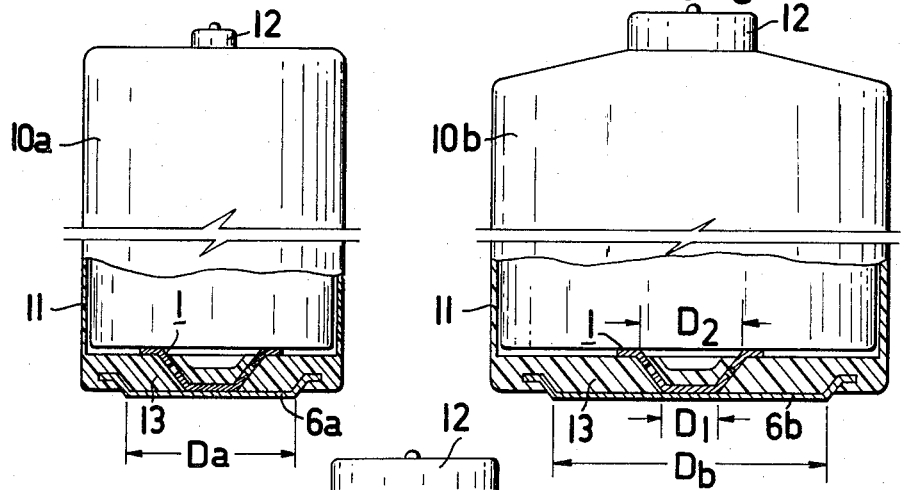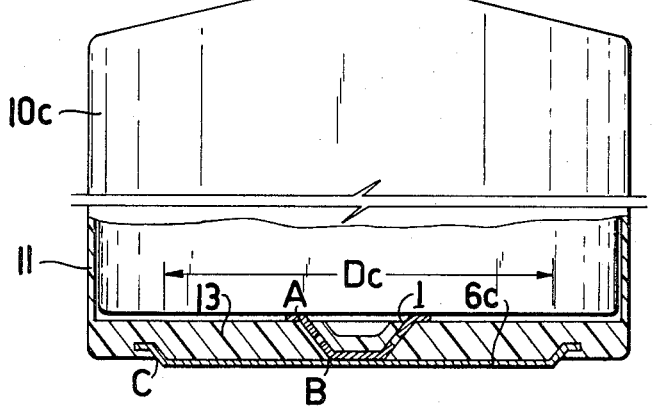
INVENTORS.
ERNST KAROBATH and
WOLFGANG PULITZER
BY
THEIR ATTORNEY.

3,701,689
PRIMARY CELLS
Ernst Karobath and Wolfgang Pulitzer, Vienna, Austria, assignors to Firma Telephon- und Telegraphen-Fabriks-Aktiengesellschaft Kapsch & Sohne, Vienna, Austria
Filed June 4, 1971, Ser. No. 149,902
Claims priority, application Austria, Aug. 21, 1970,
A 7,620/70
Int. Cl. H01m 1/02
U.S. Cl. 136—135 R
5 Claims

ABSTRACT OF THE DISCLOSURE

A primary cell of the kind having a leak-proof casing made of a thermoplastic resin has a contact member which is embedded in the bottom of the casing to provide an external electrical connection to the negative electrode of the cell and which comprises a contact plate and a tubular conductor piece which is preferably cup-shaped with an inverted frusto-conical wall. The tubular conductor piece is embedded in the casing bottom with the material of the casing extending through a series of perforations spaced around the wall of the conductor piece, one end of the conductor piece being in electrical contact with the negative electrode and the other end being bonded to the contact plate. The contact plate has an exposed face externally of the casing bottom with a diameter greater than the diameters at both ends of the conductor piece.

---

The invention relates to primary cells with a leak-proof casing made of a thermoplastic resin and a contact member embedded in the material of the casing bottom and providing an external electrical connection to the negative electrode of the cell.

Commonly the contact member takes the form of a cup-shaped piece with the rim of the cup in electrical contact with the negative electrode and the base of the cup providing an exposed face externally of the casing bottom, the embedded wall of the piece having a closely spaced row of perforations around it through which the material of the casing extends. Primary cells of this kind have proved very satisfactory in practice, for the following two reasons. In the first place the arrangement provides a mechanically strong bond, which is tight against leakage, between the contact member and the bottom of the casing. The mechanical strength of the bond is due to the embedding of the contact member and to the fact that the thermoplastic resin of the casing extends through the perforations and acts somewhat as a series of rivets. The bond is tight against leakage due to the shrinking of the plastic when it sets. Secondly, due to the embedding of the contact member, only a small area of surface remains exposed to chemical or electrochemical corrosive attack. The bottom contact is therefore well protected against corrosion.

However, primary cells are usually of circular cross section and are manufactured in a large number of different sizes, i.e. with a large number of different diameters. For each particular size of the official industrial standards specify that the negative external contact must have an exposed face with a diameter which is at least equal to a set minimum value relating to that size. Thus, for different sized primary cells of the kind described there must be manufactured cup-shaped contact members of different sizes. Series manufacture of the cup-shaped piece involves the use of fairly complex and costly stamping and drawing tools, and it is therefore expensive to manufacture different sized pieces since each size requires its own set of tools.

With the aim of reducing this cost in the manufacture of primary cells of different sizes, according to the present invention we provide a primary cell having a leak-proof casing made of a thermoplastic resin and a contact member embedded in the bottom of the casing and providing an external electrical connection to the negative electrode of the cell, the contact member comprising a tubular conductor piece which is embedded in the casing bottom with the material of the casing extending through a series of perforations spaced around the wall of the conductor piece and which has one end in electrical contact with the negative electrode, and a contact plate which is bonded to the other end of the tubular conductor piece and which has an exposed face externally of the casing bottom with an area greater than the cross-sectional area of each of the two ends of the conductor piece.

Savings in manufacturing costs are obtained by using a standard size conductor piece for all sizes of cell, the different minimum sized exposed contact faces being provided by different sized contact plates which are comparatively cheap to make in relation to the conductor pieces.

When the conductor piece is cup-shaped, preferably with an inverted frusto-conical wall with a closely spaced row of perforations around it, the diameter of the exposed face of the contact plate is greater than the diameters at both ends of the cup-shaped conductor piece, that is, greater than the diameter of the cup rim and greater than the diameter of the cup base.

The idea is therefore to manufacture the cup-shaped conductor piece, which is comparatively difficult to manufacture, so small that it can be used in any cell, irrespective of the size of the cell. Thus, only one size and type of conductor piece is made, adaptation to cells of different sizes being obtained by bonding the conductor piece, such as by spot welding, brazing, riveting or the like, to an externally exposed contact plate, which is simpler and cheaper to manufacture in different sizes, the diameter of the exposed face of the contact plate being that which is specified in the official standards for the particular size of primary cell. The advantage obtained is that the perforated cup-shaped conductor piece can easily be manufactured in large quantities at comparatively little cost by fully automatic stamping and drawing machines, the same size and type of conductor piece being used for primary cells of all sizes.

Furthermore, it has been found that in the case of circular section primary cells of conventional construction as described earlier with the negative bottom contact supported near its outer rim in the plastic bottom of the cell, in the event of an impact applied to the positive pole electrode of the cell (for example when a package containing a number of primary cells falls onto a floor) contact difficulties arise due to the cell bottom bulging out. In a cell in accordance with the invention the cell bottom is supported approximately centrally by the conductor piece of comparatively small diameter, and consequently an impact applied to the positive pole is taken, at the bottom of the cell, practically directly by the conductor piece so that even if the cell bottom does bulge outwards a good contact still remains between the cell bottom and the conductor piece.

In the cell in accordance with the invention a tight seal between the plastic of the cell bottom and the metal of the negative contact member depends only on the construction of the central part of the cell bottom. This fact is important in the case where a previously manufactured cell bottom has to be joined by a method involving heating to a thin walled casing jacket, for example a casing jacket in the form of a section cut off from an extruded tube. This involves softening the plastics material around the rim of the cell or casing bottom, and with contact members in conventionally constructed cells there is a risk of damaging the bond between the metal and the plastic. This risk is much reduced in the present cell since the conductor piece is supported near the middle of the cell bottom, rather than near the rim as in the conventional cells.

Preferably the base of the cup-shaped conductor piece is bonded to the contact plate, and if the base lies flush with or stands proud of the casing bottom the bond is made easy to effect such as by welding, brazing or riveting.

Examples of primary cells in accordance with the present invention are illustrated in the accompanying drawings, in which:

FIG. 1 is a cross-section through a cup-shaped conductor piece;

FIG. 2 shows cross-sections through three different sizes of contact plate, any size being suitable for bonding to a conductor piece;

FIG. 3 shows cross-sections of bottom contact members in three different sizes, suitable for use in primary cells of three different sizes and formed by combining a conductor piece as shown in FIG. 1 with each of the contact plates of FIG. 2;

FIG. 4 shows an alternative form of bottom contact member; and,

FIGS. 5, 6 and 7 are side elevations, partly sectioned, of three different sizes of primary cell equipped with the bottom contact members shown in FIG. 3.

In FIG. 1 the cup-shaped conductor 1 is represented greater than natural size. The conductor piece 1 has a cup base 2 and a wall 3 perforated with a row of closely spaced perforations 5 extending all the way around it. The base 2 is circular and the wall 3 extends upwards and outwards from the base in the form of an inverted frusto-conical shape. When such a conductor cup 1 is manufactured by drawing in a press the rim of the cup is usually rather uneven. The conductor cup 1 is therefore made with a radially outwardly extending annular flange 4 around its upper edge. This ensures good electrical contact between the upper edge of the cup 1 and a further conductor, and also gives the conductor cup better structural rigidity, sufficient even for use in comparatively large primary cells.

FIG. 2 shows three different sizes of contact plate 6a, 6b and 6c. The rim 7 of each contact plate is flanged upwards and radially outwards to give the plate a shallow dished-shape, and the plates can easily be manufactured by a simple stamping or pressing operation. Any size of such a contact plate can be bonded to the conductor cup shown in FIG. 1 provided the diameter of the plate base is greater than the diameter of the cup base or of the cup rim.

FIG. 3 shows the three different sizes of bottom contact members formed by bonding a conductor cup 1 to each of the contact plates 6a, 6b or 6c. In each case the base of the conductor cup 1 is bonded to the contact plate and may be effected by spot welding, brazing or riveting.

FIG. 4 illustrates an alternative way of forming the contact member, in which the conductor cup 1 is arranged upside down on the contact plate 6b, the edge flange 4 of the cup being bonded to the surface of the contact plate.

FIGS. 5 to 7 show diagrammatically three different sizes of primary cells 10a, 10b and 10c fitted with the contact members of FIG. 3. Each cell has an outer leak-proof casing 11, at the top of which is a contact cap 12 in electrical contact with the positive pole of the cell, and in the plastics material forming the casing bottom 13 there is embedded a bottom contact member 6a, 6b or 6c. The conductor cup 1 of the member is embedded with the thermoplastic resin of the casing bottom penetrating through the perforations 5 and covering the inside of the conductor cup, the set resin in each performation acting somewhat as a rivet. The upper flanged rim 4 of the cup 1 projects inside the casing and rests in contact with the negative electrode of the cell. The contact plate 6a, 6b, or 6c which is bonded to the cup 1 lies flush with the exterior of the casing bottom and the flanged edge 7 of the contact plate projects into and is fully embedded in the casing bottom to hold the plate firmly in position. The underface of the base part of the contact plate is completely exposed to provide the negative contact (external) of the cell.

In FIGS. 5 to 7 the dimensions $Da$, $Db$, $Dc$ are the diameters of the externally exposed surfaces of the contact plates 6a, 6b, 6c. These diameters are equal to those which are specified in the official standards for the different sized cells shown. FIG. 6 shows at $D_1$ the diameter of the conductor cup base and at $D_2$ the diameter of the mouth of the conductor cup. Both these dimensions $D_1$ and $D_2$ are less than the diameters $Da$, $Db$, $Dc$ of the externally exposed surfaces of the contact plates 6a, 6b, 6c.

In addition to the advantages already mentioned, the approximately central embedding of the bottom contact member in the material of the casing bottom makes the corrosion path much longer than the thickness of the bottom contact plate. This is shown, for example in FIG. 7, where the corrosion path extends from the point A to the point B. This distance can be 15 to 20 times greater than the thickness of the contact plate. Furthermore in regard to possible leakage of electrolyte along the interface between the bottom contact member and the casing bottom, here again the leakage path is very long, extending in FIG. 7 from the point A, through the point B to the point C. This distance can be 40 to 100 times the contact plate thickness.

The outer casing 11 can be manufactured in various ways. By one method the casing jacket and the casing bottom are made of the same material, and the entire casing, with the bottom contact member in position, as represented in FIG. 3 or 4, can be injection moulded in one operation.

Alternatively the casing may be made in such a way that the bottom is very tight against leakage of electrolyte, where as the casing jacket is permeable to gases. In this case the jacket and the bottom are preferably made of different plastics materials. The jacket may be formed from a cut off length of extruded tube. The bottom may be injection moulded directly on the lower end of the jacket, with simultaneous embedding of the bottom contact member. Alternatively, if desired, the casing bottom can be made by injection moulding directly on the bottom contact member, forming a bottom assembly which is then welded or adhesion bonded to the casing jacket.

We claim:

1. In a primary cell including positive and negative electrodes, a leak-proof casing made of a thermoplastic resin, and a contact member embedded in the bottom of said casing and providing an external electrical connection to said negative electrode, the improvement wherein said contact member comprises a tubular conductor piece embedded in said casing bottom and having a wall and first and second ends, a plurality of perforations spaced around said wall and through which the material of said casing extends, and a contact plate bonded to said second end of said tubular conductor piece, said first end of said conductor piece lying in electrical contact with said negative electrode, and said contact plate having an exposed face externally of said casing bottom with an area greater than the cross-sectional area of each of said first and second ends of said conductor piece.

2. A primary cell as claimed in claim 1, wherein said conductor piece is cup-shaped, having a base at said second end bonded to said contact plate.

3. A primary cell as claimed in claim 1, wherein said conductor piece is provided with a radially outwardly projecting flange at said first end in contact with said negative electrode.

4. A primary cell as claimed in claim 1, wherein said contact plate has around the periphery of said exposed face a flange projecting into and embedded in said material of said casing bottom.

5. A primary cell including positive and negative electrodes, a leak-proof casing made of a thermoplastic resin, a cup-shaped conductor piece embedded in the bottom of said casing and comprising a wall having a frusto-conical shape, first and second ends, and a plurality of perforations closely spaced in a row around said wall and through which the material of said casing extends, and a contact plate bonded to said second end of said conductor piece and having an exposed face externally of said casing bottom with a diameter greater than the diameters of said first and second ends of said conductor piece, said first end of said conductor piece lying in electrical contact with said negative electrode.

References Cited

UNITED STATES PATENTS

| | | | |
|---|---|---|---|
| 3,115,429 | 12/1963 | Reilly et al. | 136—133 |
| 3,501,351 | 3/1970 | Karobath | 136—133 |

DONALD L. WALTON, Primary Examiner

U.S. Cl. X.R.

136—169